United States Patent [19]

Smith

[11] Patent Number: 5,407,096

[45] Date of Patent: Apr. 18, 1995

[54] APPARATUS FOR PROVIDING A PORTABLE SOURCE OF HIGH PRESSURE GAS

[75] Inventor: Brian J. Smith, San Antonio, Tex.

[73] Assignee: Sherman Products Corporation, Houston, Tex.

[21] Appl. No.: 96,950

[22] Filed: Jul. 23, 1993

Related U.S. Application Data

[63] Continuation-in-part of Ser. No. 2,032, Nov. 30, 1992.

[51] Int. Cl.⁶ .............................................. G01F 11/00
[52] U.S. Cl. ........................................ 222/1; 137/881; 222/3; 222/175
[58] Field of Search ...................... 222/1, 3, 5, 175; 137/879, 881; 251/321, 322

[56] References Cited

U.S. PATENT DOCUMENTS

| | | | |
|---|---|---|---|
| 1,614,532 | 1/1927 | Mobley | 222/509 |
| 2,016,113 | 10/1935 | Lambert et al. | 221/73.5 |
| 2,021,603 | 11/1935 | Kelly, Jr. et al. | 221/73.5 |
| 2,747,775 | 5/1956 | Pritchard | 222/400.7 |
| 2,750,071 | 6/1956 | Ritchie | 222/3 |
| 2,853,263 | 9/1958 | Murray | 251/74 |
| 3,291,341 | 12/1966 | Simmons | 222/4 |
| 3,450,313 | 6/1969 | Jonas | 202/175 |
| 3,709,044 | 1/1973 | Chacko | 74/2 |
| 3,782,413 | 1/1974 | Chacko | 137/565 |
| 3,817,302 | 6/1974 | Kowal et al. | 222/5 X |
| 3,825,223 | 7/1974 | Richardson | 251/149.6 |
| 4,069,947 | 1/1978 | Oakes | 222/5 |
| 4,402,340 | 9/1983 | Lockwood, Jr. | 222/3 X |
| 4,489,855 | 12/1984 | Boetger | 222/5 |
| 4,682,621 | 7/1987 | Kipling | 137/116.3 |
| 4,684,037 | 8/1987 | Gnutti et al. | 222/3 |
| 4,694,850 | 9/1987 | Fumino | 137/318 |
| 4,773,454 | 9/1988 | Kroh et al. | 141/330 |
| 4,969,493 | 11/1990 | Lee | 141/38 |
| 5,020,395 | 6/1991 | Mackey | 81/3.2 |
| 5,234,015 | 8/1993 | Fumino | 222/5 X |

Primary Examiner—Andres Kashnikow
Assistant Examiner—Joseph A. Kaufman
Attorney, Agent, or Firm—Gunn, Lee & Miller

[57] ABSTRACT

The present invention provides a portable source of high pressure gas that may be used by service or construction workers. A portable high pressure cylinder is filled with liquid $CO_2$. A triggering device is threadably connected to a fitting on the upper portion of the cylinder, which fitting contains a high pressure press release valve and an over-pressure relief valve. A unitary housing for the triggering device contains all of the other internal working parts, including the push plate, plunger, and other components for a simplistic, easily usable source of pressurized gas. A belt clip allows the workmen to carry the source of pressurized gas with them for ease of use in their jobs.

2 Claims, 3 Drawing Sheets

APPARATUS FOR PROVIDING A PORTABLE SOURCE OF HIGH PRESSURE GAS

CROSS-REFERENCE TO RELATED APPLICATION

This is a continuation-in-part of my patent application Ser. No. 29/002,032, filed on Nov. 30, 1992, entitled "Valve Trigger."

FIELD OF THE INVENTION

This invention relates to an apparatus for providing a portable source of high pressure gas and, more particularly, to the triggering mechanism that is connected to a small portable cylinder of liquid $CO_2$ that can be dispensed in short bursts.

BACKGROUND OF THE INVENTION

The Clean Air Act now prohibits the release of the compressed gases known as chlorofluorocarbons and hydrochlorofluorocarbons into the atmosphere. These compressed gases are used in air conditioning and refrigeration equipment and must now be recycled.

In the past, service and construction personnel have found it convenient to use these compressed gases for various odd jobs such as purging pipes and conduits when working on refrigeration systems; testing refrigerant, gas, and water lines; and drain and machinery blow out.

Therefore, it is now necessary to find or develop another convenient, light weight source and/or delivery system for high pressure gas which can be used for various odd jobs.

Many different sources of high pressure gas have been developed in the past. However, the different systems that have been developed do not have the light weight, portable capabilities as the present invention. For example, an air conditioning or refrigeration technician needs to be able to carry a small, portable source of high pressure gas that can be used repeatedly for blowing out lines and for cleaning out coils and furnaces, just to name a few possible uses.

SUMMARY OF THE INVENTION

It is an object of the present invention to provide a portable source of high pressure gas that can be repeatedly dispensed in high pressure bursts.

It is another object of the present invention to provide a portable system for dispensing an environmentally safe, high pressure gas in short high pressure bursts in a manner that can be conveniently used by construction and/or service personnel, especially in the heating and air conditioning industry.

It is yet another object of the present invention to provide a unique valve triggering device for releasing a source of high pressure $CO_2$ from a cylinder for use in blow out of lines, etc.

It is still another object of the present invention to provide a valve trigger assembly that can withstand up to approximately 4500 PSI for delivering a source of pressurized gas in short bursts, which short bursts may be used for any of the following purposes:

Pressure test refrigerant, gas and water lines
Blow out lines and drains
Clean out coils, furnaces and machinery
Power pneumatic air lifts
Thread cleaning
Debris removal
Tire inflation
Cooling hot surfaces It is an even further object of the present invention to provide a simple attachment to a standard pressure cylinder for providing short bursts of high pressure $CO_2$ that may be used for any of a number of purposes.

The present invention includes a cylinder to which is attached a fitting having a valve located in the middle of the fitting. O-rings seal the fitting to the cylinder. In the event the cylinder becomes over-pressurized, a pressure relief valve will release pressure from the cylinder.

Connected to the fitting located in the cylinder is a triggering device. The triggering device has a unitary housing for threadably connecting to the fitting and extending over the entire fitting and nearly abutting the upper shoulders of the cylinder. Contained within the unitary housing is a plunger that is threadably connected through a central opening to the top of the housing. At the top of the housing is a screw extending through a plate and threadably connecting to the plunger. By spring loading, the plate and screw are returned to the top abutting surface of the housing. By pushing the plate, the plunger extends downward and presses against the valve contained in the fitting. This releases high pressure $CO_2$ contained in the cylinder, which high pressure $CO_2$ is discharged up through the housing and out a threaded fitting connected in the side of the unitary housing. The threaded fitting will normally be connected to a flexible hose for delivering the high pressure $CO_2$ to the exact location desired.

The entire cylinder with the housing and all internal components may be connected by a belt clip to the belt of the workman that is utilizing the source of high pressure $CO_2$. By utilizing the entire system, the workman can conveniently press down on the plate which depresses the plunger and actuates the valve. This in turn will allow the high pressure gas from the cylinder to escape through the housing, the fitting, and the hose to the point where it is to be discharged.

DESCRIPTION OF THE PREFERRED EMBODIMENT

Figure 2:
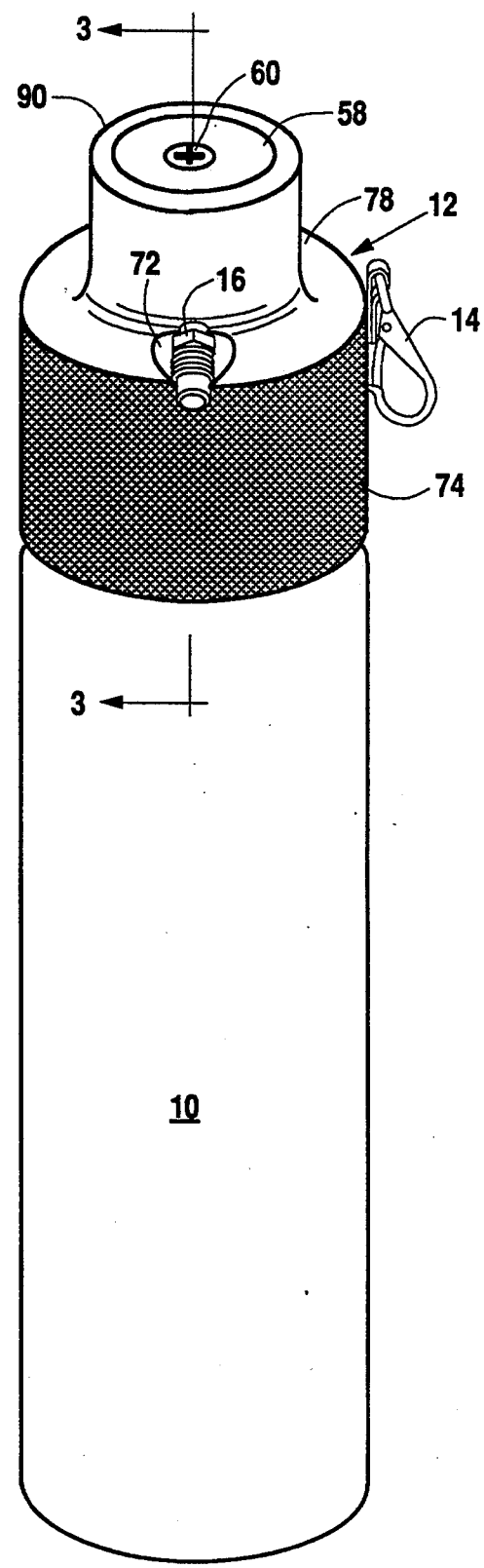
FIG. 2 is a perspective view of the present invention.

Referring to FIG. 2, the present invention is illustrated in a perspective view with a light-weight, high pressure cylinder being represented generally by reference numeral 10 and the triggering device being represented by reference numeral 12. Connected to the triggering device 12 is a belt clip 14 for attaching the entire unit to a person's belt for ease of access. An interchangeable fitting 16 connects through the triggering device 12 in a manner as will be described in more detail subsequently.

Contained within the light weight, high pressure cylinder 10 is liquid carbon dioxide ($CO_2$). By pressing the top of the triggering device 12, gaseous $CO_2$ will be discharged through the interchangeable fitting 16. The discharged $CO_2$, if not already in a gaseous form, will change to gas as it is discharged.

Figure 1:
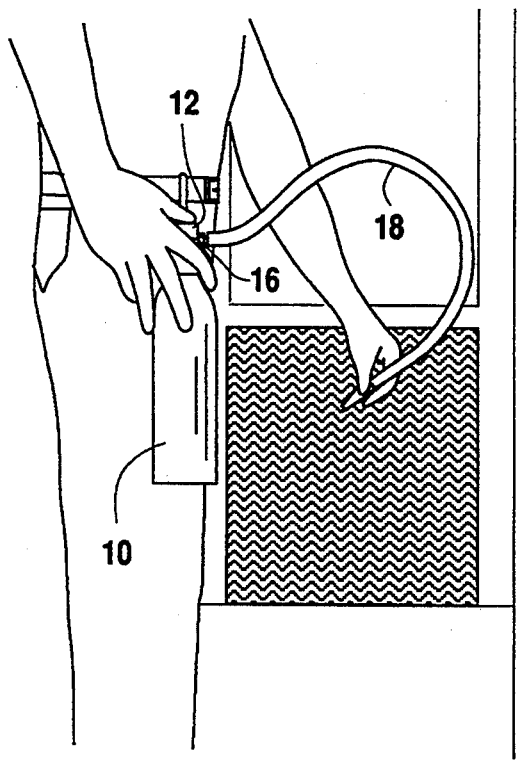
FIG. 1 is an environmental view illustrating a typical usage of the present invention to clean air conditioning coils.

Referring to the environmental view as illustrated in FIG. 1, a worker is shown pressing the top of the triggering device 12, which in turn causes a discharge of high pressure $CO_2$ through the interchangeable fitting 16. The high pressure discharge may be directed toward the work object (in this case refrigeration coils) by a high pressure, flexible hose 18. A hose of any desired length may be used to discharge the high pressure gas in the manner selected by the user. It is important that the end of the hose 18 be securely held in position to prevent the hose 18 from whipping and possibly injuring the user. In the manner described, short bursts of high pressure air can be applied to the object being worked on by the user.

Figure 3:
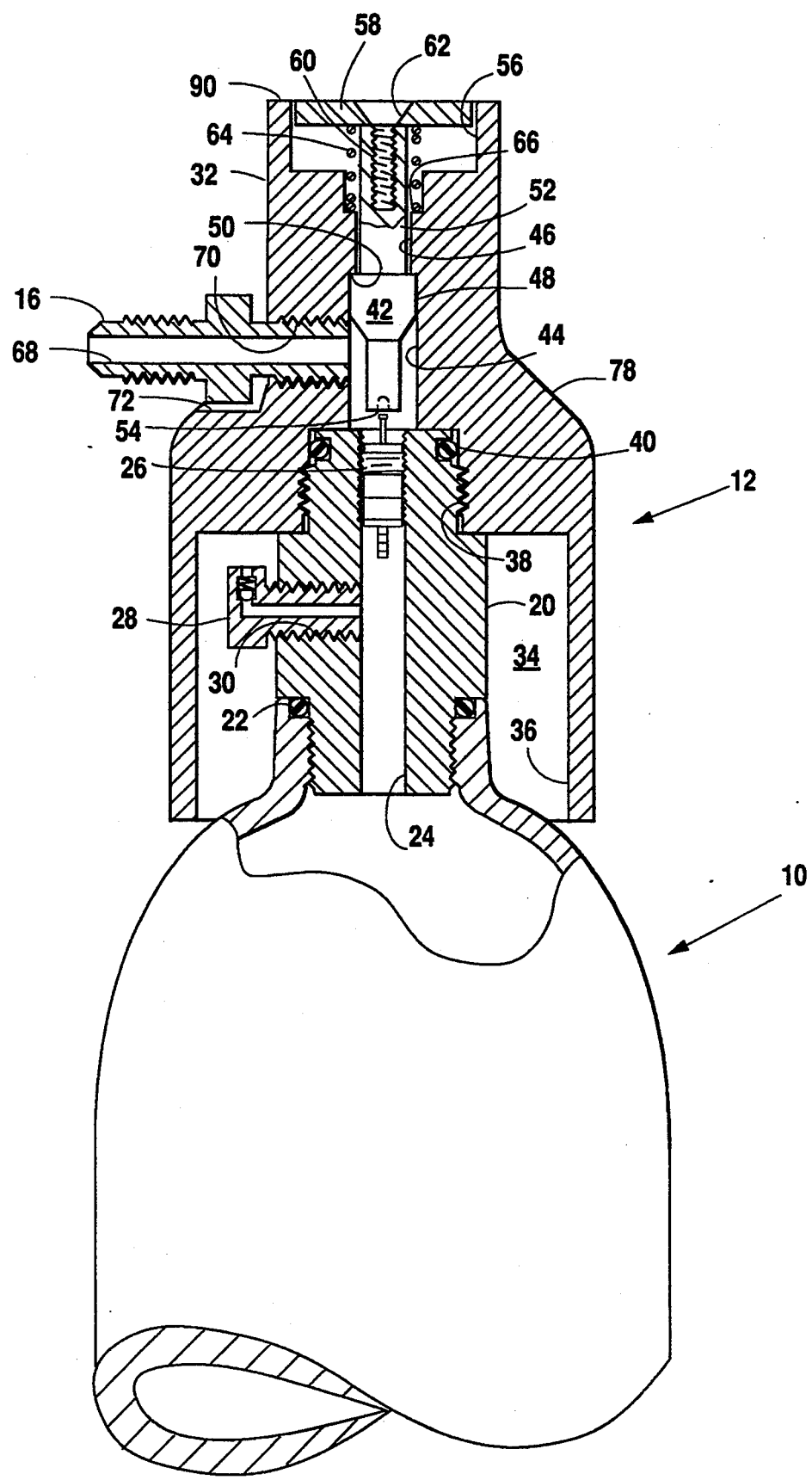
FIG. 3 is a partial cross-sectional view of FIG. 2 taken along section lines 3—3.
Figure 4:
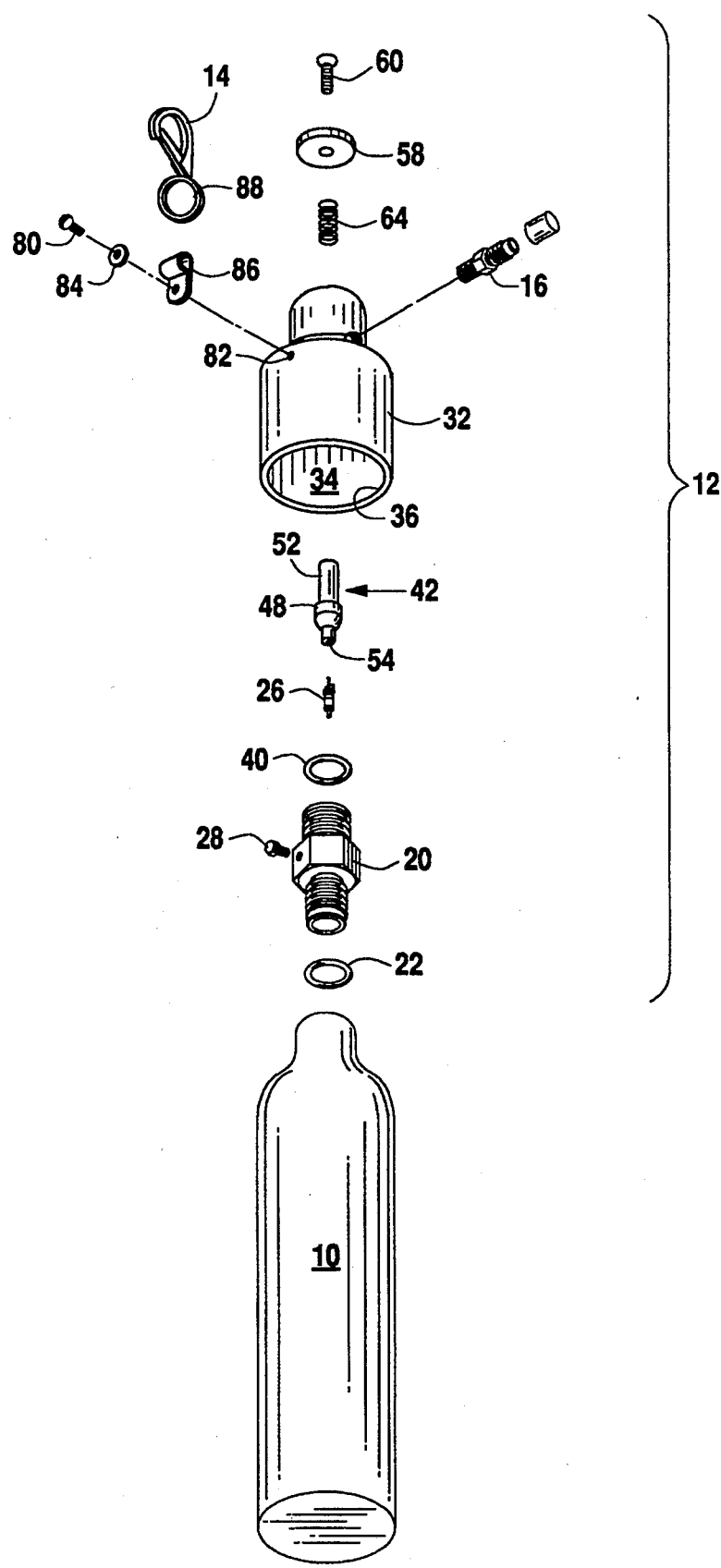
FIG. 4 is an exploded perspective view of the present invention.

Referring now to FIGS. 3 and 4, the internal structure of the triggering device 12 will be explained in more detail. In the top of the light weight, high pressure cylinder 10 is located a fitting 20. The fitting 20 is sealed to the high pressure cylinder 10 by means of O-ring seal 22. The fitting 20 has a central opening 24 in which is located a valve 26. Valve 26 is commonly known as a Shrader valve. The valve 26 has been tested for 2500 PSI. Extending from the side of the fitting 20 is a pressure release valve 28 that screws into cross-opening 30.

The triggering device 12 has a unitary housing 32 that has a central passage 34 therethrough. An enlarged lower portion 36 of the central passage 34 receives the fitting 20 therein complete with the pressure release valve 28. A threaded central portion 38 of the central passage 34 of the unitary housing 32 threadably receives the upper end of the fitting 20 therein. When the unitary housing 32 is screwed down via the threaded central portion 38 onto the fitting 20, O-ring seal 40 is compressed to prevent leakage between the fitting 20 and the unitary housing 32.

A plunger 42 is contained within a shoulder portion 44 and a plunger portion 46 of the central passage 34. The plunger 42 has a shoulder 48 that abuts with shoulder surface 50. The upper cylinder 52 of the plunger 42 is slidably received inside of plunger portion 46 of the central passage 34. In its normal position, a lower recess 54 of the plunger 42 is located directly above the upper portion of the valve 26.

An enlarged upper portion 56 of the central passage 34 receives a push plate 58 therein. Screw 60 extends through a countersunk opening 62 in the push plate 58 and is threadably connected to the top of the plunger 42. Spring 64 which rests against spring shoulder 66 in the central passage 34 continuously urges the push plate 58, screw 60, and plunger 42 upward. By a worker pushing on the push plate 58, spring 64 is compressed and screw 60 with plunger 42 threadably connected thereto moves downward to engage the valve 26. By engaging the valve 26 high pressure gas contained in light weight, high pressure cylinder 10 is released.

The interchangeable fitting 16 has a discharge passage 68 therethrough that allows for high pressure gas to be discharged. The interchangeable fitting 16 is threadably connected to cross-passage 70. Cross-passage 70 connects to the central passage 34 at the shoulder portion 44. The high pressure flexible hose (shown in FIG. 1) is connected to the outer portion of interchangeable fitting 16. As can be seen in FIG. 2, the unitary housing 32 of the triggering device 12 may have to be notched in the manner represented by reference numeral 72 to receive the interchangeable fitting 16 therein.

To allow for ease of screwing the triggering device 12 onto the fitting 20, the lower outer surface is knurled as illustrated by reference numeral 74. This provides for gripping ease. Also the unitary housing 32 is reduced in size and weight to allow for ease of use as represented by the shoulder 78 on the external portion thereof.

A belt clip 14 is threadably connected to the unitary housing 32 by means of a screw 80 extending into threaded hole 82. The screw 80 extends through washer 84 and nylon holder 86, which in turn holds the ring 88 on the belt clip 14.

In actual use, the light weight, high pressure cylinder 10 is designed for 20 ounces of fluid. Sixteen ounces of liquified $CO_2$ is loaded into cylinder 10. This amount of liquified $CO_2$ should average between 150 and 200 one second blasts of high pressure gas. If desired, a restriction can be applied to the discharge, which will increase the usage time. The worker pushes the push plate 58 which causes the plunger 42 to go down and engage the Shrader valve 26. This will release the high pressure $CO_2$ contained within cylinder 10. The high pressure $CO_2$ is discharged through fitting 16 and may be delivered to any work surface desired through high pressure, flexible hose 18. The upper rim 90 of the unitary housing 32 prevents the push plate 58 from being accidentally pushed and causing an accidental discharge of high pressure gas.

If a cylinder 10 is continuously discharged for a long period of time, it is possible that icing may occur on the external portion of the cylinder. Also, cylinders containing pressurized $CO_2$ should not be left in extremely hot areas above 130 degrees Fahrenheit for long periods of time. When a cylinder is full and is subject to hot areas above 130 degrees Fahrenheit, the $CO_2$ will be at its highest pressure. In the event the pressure inside the cylinder 10 exceeds 3000 PSI, pressure release valve 28 will blow, discharging the cylinder and preventing any damage due to an exploding cylinder.

The pressure of the carbon dioxide contained in cylinder 10 depends upon the amount of $CO_2$ contained therein as well as the temperature of the surroundings. A hot cylinder produces a higher pressure gas and a cool cylinder produces a lower pressure gas. To prevent the over filling of the cylinder when it is cold, a scale should be used to weigh the amount of $CO_2$ put into the cylinder so that it does not exceed 16 ounces. Because the cylinder 10 being used weighs 19.3 ounces, a full cylinder containing 16 ounces of liquid $CO_2$ should weigh 35.3 ounces or approximately 2.2 pounds.

Also, by having a refrigeration fitting on the end of flexible hose 18, the present invention can be used in purging refrigeration systems. Another possible usage is by having an adaptor on the end of the high pressure, flexible hose 18, the apparatus may be used for inflating tires in emergency situations.

The foregoing has outlined some of the more pertinent objects of the present invention. These objects should be construed as being merely illustrative of some of the more prominent features and applications of the invention. Many other beneficial results can be obtained by applying the disclosed invention within the scope of the invention. Many other beneficial results can be obtained by applying the disclosed invention in a different manner or modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

I claim:

1. A method of providing blasts of environmentally safe high pressure gas by service or construction personnel to a desired location, said method including the following steps:

pressurizing a high pressure, light weight cylinder with liquid $CO_2$ to approximately 80 percent full through a fitting in a threaded upper end of said high pressure, light weight cylinders;

threadably connecting a unitary external housing to said fitting, said unitary external housing therein having a pressure means for urging a plunger located above a Shrader type valve inset fitting away from a Shrader type valve;

depressing an upper surface of said unitary external housing in an axial direction by direct thumb pressure thereagainst to move said plunger into contact with said Shrader type valve to discharge $CO_2$ from said high pressure, light weight cylinder via cross-passage in said unitary external housing;

releasing said upper surface to stop discharge of said $CO_2$ from said cross-passage of said unitary external housing;

securing a flexible hose to said cross-passage in said unitary external housing and directing a terminal end of said flexible hose at said desired location upon said discharge of $CO_2$;

attaching said unitary external housing to said personnel with a belt clip for ease of movement by said personnel;

repeating said presurizing step through said Shrader type valve after said high pressure, light weight cylinder has been substantially depleted of liquid $CO_2$; and said unitary external housing containing all moveable parts therein.

2. The method of providing blasts of environmentally safe high pressure gas by service or construction personnel as recited in claim 1 including a first step of installing an over-pressure relief valve to discharge $CO_2$ from said high pressure, light weight cylinder if a predetermined pressure is exceeded.

* * * * *